Patented June 24, 1924.                                    1,498,960

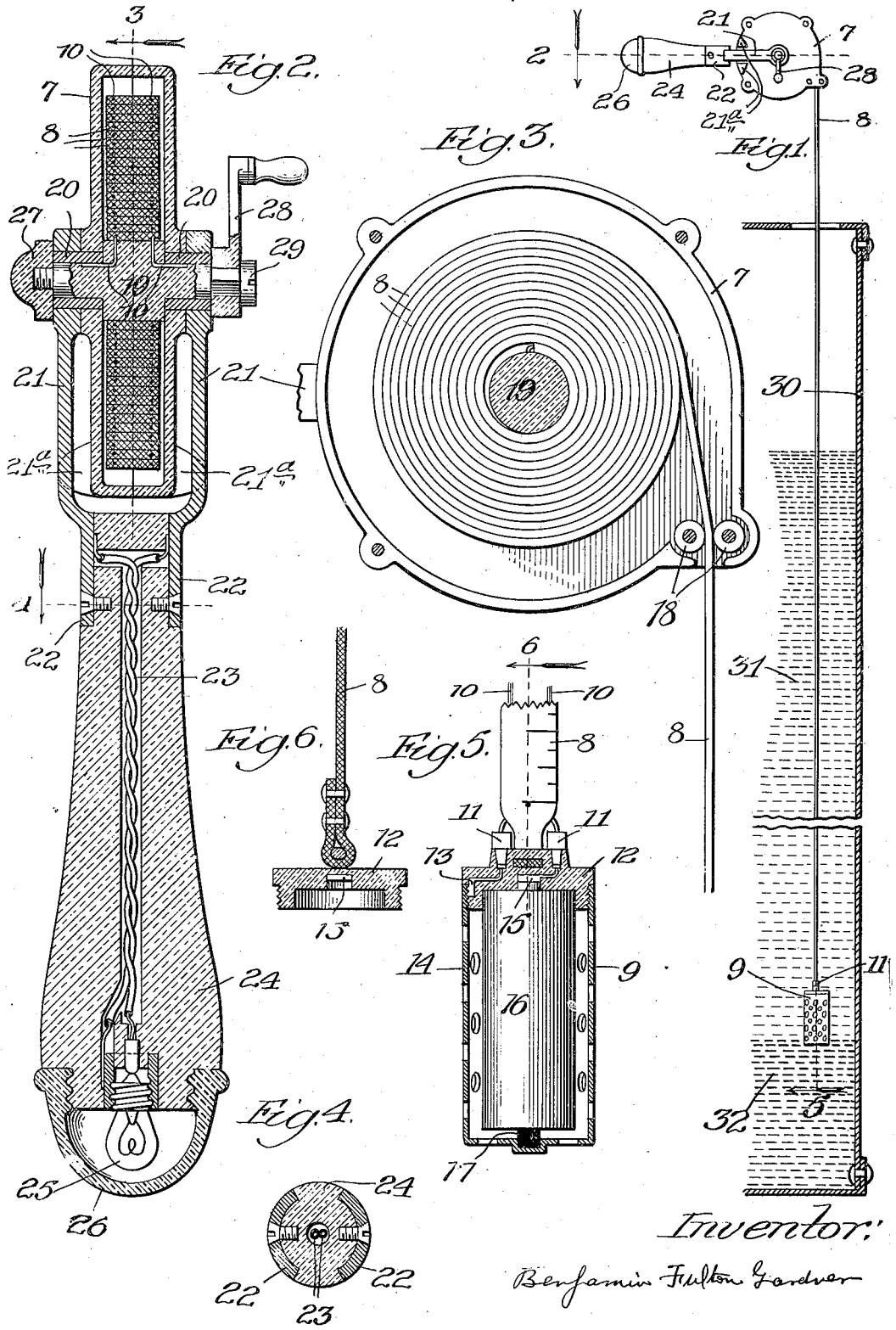

UNITED STATES PATENT OFFICE.

BENJAMIN FULTON GARDNER, OF CHICAGO, ILLINOIS.

ELECTRIC OIL GAUGE.

Application filed April 7, 1922. Serial No. 550,513.

*To all whom it may concern:*

Be it known that I, BENJAMIN FULTON GARDNER, citizen of the United States, residing at city of Chicago, in the county of Cook and State of Illinois, have invented a certain new and useful Improvement in an Electric Oil Gauge, of which the following is a full, clear, concise, and exact description, reference being had to the accompanying drawings, forming a part of this specification.

My invention comprises an improved method to quickly and easily ascertain the content of oil in a tank or other receptacle. Tanks at oil wells contain three radically different substances, i. e., oil, water and sediment. The latter, in the form of settlings, at the bottom, salt water above and the oil superimposed thereon. The present process of gaging the oil in tank is to draw off the water. To do this is not desirable except when necessary to turn the oil into the pipe line, because it exposes the empty part of the tank to the weather, causing leakage at at the stave joints. Again it is troublesome to draw the water plug at the bottom of a two hundred and fifty barrel tank, and more difficult to replace it. Considerable oil is wasted by this method. Again, a cumbersome device is used to remove samples from the various fluid strata. Time is required by this process to locate the different fluids not visible beneath the oil. The more facile method, the subject of my invention, enables one to instantaneously and automatically determine the oil content of a tank and per se the depth of water. So much oil above, means so much water below. To determine the former is equivalent to ascertaining a measure of the latter.

This invention is intended as an improvement upon that described and claimed in a separate application for Letters Patent of the United States, filed by me August 4, 1921, Serial No. 489,897, patented January 30, 1923, No. 1,443,357, and my invention consists in the features, details of construction, and arrangement hereinafter described and claimed.

In the drawings, Fig. 1, is a view of my improved oil gauge, illustrating its manner of use; Fig. 2, an enlarged sectional view of the same taken on line 2 of Fig. 1; Fig. 3, a sectional elevation of the reel thereof taken on line 3, of Fig. 2; Fig. 4, a transverse sectional view through the handle, taken at line 4, of Fig. 2; Fig. 5 an enlarged sectional elevation of the battery or weight and Fig. 6, a sectional view of the battery cap illustrating the connection therewith of the measuring tape, the view being taken on line 6, of Fig. 5.

Like numerals refer to like parts in the several figures.

On Figs. 1, 2 and 3, 7 represents the housing of the reel which may be made of fiber or other insulating material; 8 in Figs. 1, 2, 3, 5 and 6, is a measuring tape with electric conductors in the form of insulated wire woven in the fabric of the tape shown by the numeral 10, in Fig. 5; 9 in Figs. 1 and 5 representing a plummet or sounding weight, which comprises circuit closing means and also a source of electrical energy. 11, shown in Figs. 1 and 5, are insulated connectors, connecting the conductors in the tape to the battery. 12, in Figs. 5 and 6, is the battery cap of insulating material to which the insulating center of the tape is attached supporting the weight of the battery and relieving the strain on the electric connections and the delicate conductors. 13, in Fig. 5, is a metallic connection between the conductors, 10 and the shell 14 of Fig. 5. 15, in Fig. 5, is a metallic strip connecting the battery to one of the tape conductors; 16, shown in Fig. 5, is an ordinary dry cell, or a plurality of cells of the type used in flash lights. 14, in Fig. 5, is a perforated metallic shell. This shell encases the battery cell and is preferably made of zinc. 17, Fig. 5, is an insulating part upon which the cell 16 rests; 18, Fig. 3, illustrates guide and compression rolls through which the tape passes into and out of the reel; 19, in Figs. 2, and 3, represents a spool of insulating material carrying the tape, the ends of the part, 19, are round, extend through the housing 7, and carry metal trunnion rings, to these parts the conductors 10 are soldered, or otherwise connected. 21, in Fig. 1, and Fig. 2, are metallic parts to which the grip or handle, 24, shown in the same figures, is connected. These parts support the reel 7, and are made to turn upon the trunnion rings 20; 21ª in Figs. 1 and 2, are stops on the reel case 7, designed to keep the reel case from turning when winding up the tape measure. 22, in Figs. 1, 2 and 4, illustrate the manner of attaching the metal parts, 21, to the wood handle taken on line 4, of Fig. 2; 23, in Fig. 2, shows the wire conductors connected to the metal parts 21, to transmit the current to the signal lamp 25, mounted in the end of the handle 24. A glass lens part 26, in Figs. 1 and 2, encloses the signal lamp and increases the efficiency thereof. 27, Fig. 2, a nut threaded to the part 19, and 29, Fig. 2, is a bolt supporting the reel crank handle, 28, shown in Figs. 1 and 2; 30, is a sectional view of a tank. Fig. 1, 31, in same figure, illustrates the oil content and 32, the water beneath the oil.

The construction and function of my invention may be regarded as an annunciator, which implies, it is operative electrically. To trace the electric current from its source to the signal shown in the drawing as a miniature lamp. 16, in Fig. 5, is a battery cell, within a perforated zinc case, 9, normally spaced and insulated from the case by fiber cap 12, and bottom part 17. To this perforated zinc or metal case is electrically connected one side of the circuit, woven in the measuring tapeline. The other side of the circuit is likewise threaded through the tapeline and is connected to the positive terminal of the battery. This construction effects two distinct functions. When the battery part is in contact with water the circuit is closed. In oil, the fluid switch is open, and the current is not transmitted to the signal lamp. The outer zinc part supplements the zinc part of the battery and it is, likewise a galvanic element; the salt water in tanks, which enters through the perforation in the outer casing, not alone acts to close the circuit, but also as an electrolyte, increasing the electric efficiency of the battery. Assume the brine has been reached by the battery plummet, the tapeline circuits conduct the current to the metal ring trunnions mounted on the ends of insulating fibre spool, 19, shown in Figs. 2, and 3. The circuit from the trunnion rings 20, Fig. 2, is traced through the metal parts, 21, Figs. 1 and 2, to the wood handle and connected to the duplex cord circuit, which transmit the current to the lamp receptacle or to the signal device.

To operate my improved oil gauge is obviously simple. The operator need but lower the battery plummet, the light is flashed the instant it has reached the water. The tape is reeled back into its case and the oil mark left upon the measuring scale of the tape is noted. If the 8 foot tank is full of fluid and the oil mark left upon the tapeline indicates 3 feet of oil, then the remainder is 5 feet of water. The signal is operable when the battery is in water, but not so when in oil, as oil is an effective insulator.

While I have herein shown and described what I deem to be a preferred manner and means of carrying out my invention, yet it will be understood that the method and device may be modified without departing from the invention, and I do not, therefore, limit myself to exact details, except to such extent as such details are made the subject of specific claims.

What I claim as new, and desire to have covered by Letters Patent is—

1. An electric oil gauge comprising a reel on which is wound a graduated tape line with conductors attached thereto and a handle for rotatably supporting said reel with a signal in said handle attached to said conductors with a circuit closer attached to the free ends of said conductors.

2. A signaling system comprising a graduated tape line with conductors attached thereto, a weight on the end of said tape line comprising a perforated casing with battery therein insulated from the casing and spaced from the walls thereof, with one conductor attached to a battery terminal and the other attached to the casing so that the battery circuit will be closed when conducting liquid enters the casing and a signal in said battery circuit.

In witness whereof, I hereunto subscribe my name this 28th day of March, A. D. 1922.

BENJAMIN FULTON GARDNER.

Witnesses:
    Louis L. Barber,
    Marie Cooper.